United States Patent

[11] 3,542,416

[72] Inventors Edward C. Nelson
  Lake Orion;
  Paton M. Zimmerman, Detroit, Michigan
[21] Appl. No. 743,105
[22] Filed July 8, 1968
[45] Patented Nov. 24, 1970
[73] Assignee General Motors Corporation
  Detroit, Michigan
  a corporation of Delaware

[54] SUPPORT ROD FOR FOAM-FILLED SUNSHADE
  4 Claims, 7 Drawing Figs.
[52] U.S. Cl. .................................................. 296/97
[51] Int. Cl. ..................................................... B60j 3/00
[50] Field of Search ......................................... 296/97;
  264/Inq

[56] References Cited
  FOREIGN PATENTS
1,002,461 8/1965 Great Britain................. 296/97
1,006,058 9/1965 Great Britain................. 296/97
1,041,710 9/1966 Great Britain................. 296/97

Primary Examiner—Benjamin Hersh
Assistant Examiner—John A. Pekar
Attorneys—J. L. Carpenter and E. J. Biskup ABSTRACT: A sunshade assembly including a sunshade body filled with a semirigid foam material and having a support rod embedded in the foam material adjacent one longitudinal edge of the sunshade assembly for pivotally supporting the latter above the windshield of a vehicle. The support rod is characterized in that it includes a pair of end portions which project out of the sunshade body and each end portion is formed with a passage leading from the interior of the sunshade body to the exterior thereof, with one of the passages serving as a fill conduit and the other as a vent when the sunshade is being filled with the foam material.

Patented Nov. 24, 1970

3,542,416

INVENTORS
Edward C. Nelson &
BY Paton M. Zimmerman

E. J. Bishop
ATTORNEY

SUPPORT ROD FOR FOAM-FILLED SUNSHADE

One form of sunshade assembly presently used on vehicles consists of a hardboard panel covered with a padding material which in turn is covered with a sewn trim material. A metal retainer is fastened to one longitudinal edge of the hardboard and is formed with a tubular passage for receiving a vehicle mounted support rod which serves as a horizontal pivot about which the sunshade can be rotated between a lowered operative position and a raised stored position.

The sunshade construction described above has been considered satisfactory from the standpoint of manufacturing costs, functional utility, and cushioning ability provided by the padding material. However, as should be apparent, a sunshade made as has been described, does not lend itself to having varying designs other than planar without incurring excessive manufacturing costs due to the additional operations which would be required to make the sunshade. Accordingly, it has been proposed to make sunshades from foam plastic material which can be supplied to a mold having a preformed sunshade design providing the configuration desired. In making such a sunshade, however, a method must be devised for readily supplying the foam plastic in a liquid state to the interior of the sunshade envelope and attaching the support hardware to the assembly. The present invention is directed to this end and in its simplest form involves the use of the sunshade support rod as a conduit for conveying the liquid foam material to the interior of the sunshade envelope and also as a vent for exhausting the air displaced by the expanding foam during the cure cycle.

Accordingly, the principal objects of the present invention are to provide a sunshade support rod having the dual function of supporting the sunshade for movement about a horizontal axis above the vehicle windshield and also acting as a conduit for conveying liquid plastic foam into the sunshade envelope during the manufacture of the sunshade assembly; to provide a sunshade assembly having a generally cylindrical support rod embedded in a plastic foam material located interiorly of the sunshade and formed in a manner whereby rotation of the support rod relative to the sunshade body is restricted; to provide a sunshade support rod which has the opposed ends formed so they can be readily inserted into a plastic sunshade envelope and provide a substantial seal therebetween; and to provide a sunshade assembly, the body portion of which is formed from a plastic foam and having a support rod along one longitudinal edge thereof which has the major portion thereof enveloped by the plastic foam with opposite ends of the support rod serving as a fill conduit and air vent during the manufacturing process of the sunshade.

Other objects and advantages of the present invention will be apparent from the following detailed description when taken with the drawing in which.

Figure 1:
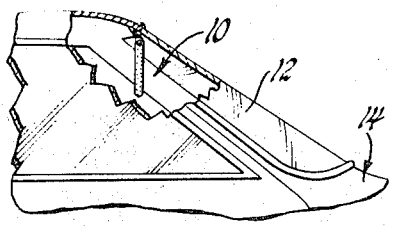
FIG. 1 is a partial side elevational view of a vehicle incorporating a sunshade assembly made in accordance with the invention.
Figure 2:
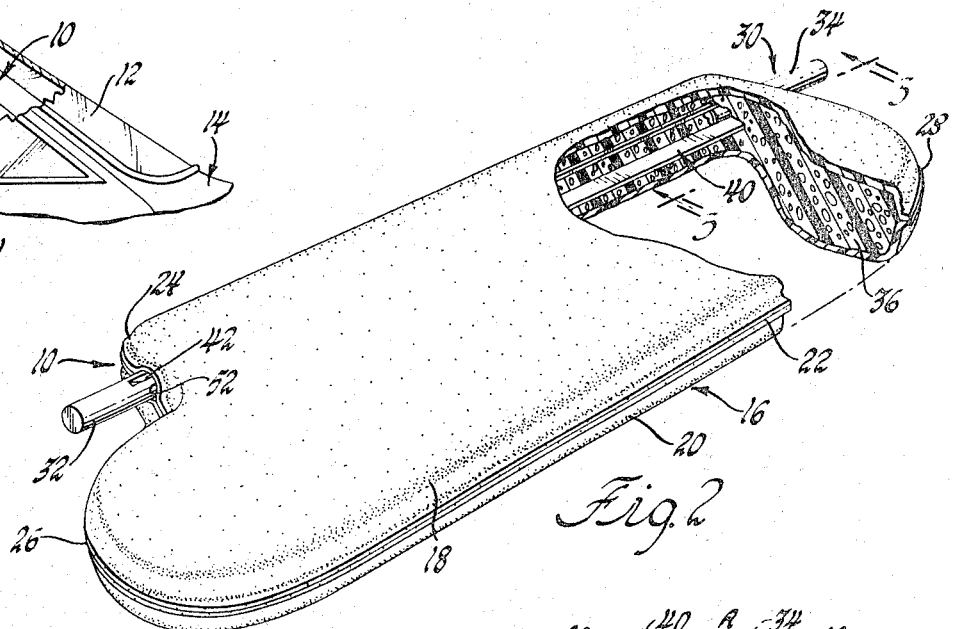
FIG. 2 is a perspective view with a portion broken away so as to reveal the details of construction of the support rod.
Figure 3:
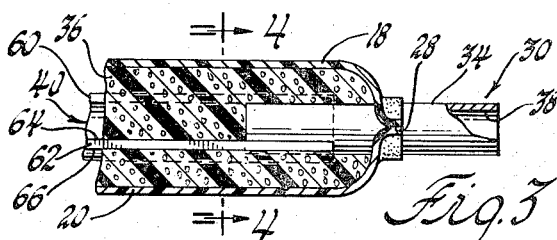
FIG. 3 is an enlarged view taken on line 3-3 of FIG. 2 and shows one end of the support rod.
Figure 4:
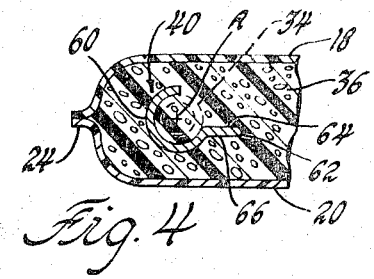
Figure 5:
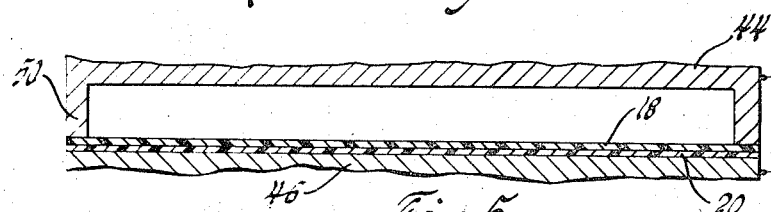
Figure 6:
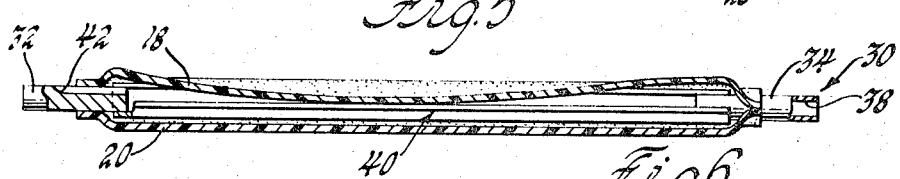
Figure 7:
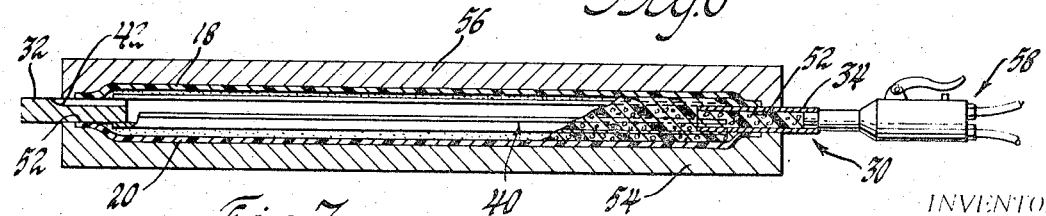

FIG. 4 is a cross-sectional view taken on line 4-4 of FIG. 3 and illustrates the configuration of the crossmember which forms a part of the support rod; and FIGS. 5, 6, and 7 show the method of manufacturing the sunshade assembly of FIGS. 1 through 4.

Referring to the drawing and more particularly FIGS. 1 and 2 thereof, a sunshade assembly generally indicated by the numeral 10 is shown pivotally supported above a windshield 12 of a vehicle 14. As seen, the sunshade assembly 10 is in the lowered operative position and it will be understood that as is customary the sunshade is mounted along a transverse horizontal axis for pivotal movement thereabout between the aforementioned position and a raised stored position.

More specifically, the sunshade assembly 10 made in accordance with the invention comprises an outer body or shell 16 consisting of a pair of spaced plastic sheets 18 and 20, the peripheral edges of which are bonded together so as to provide seams 22, 24, 26 and 28 along the longitudinal edges and side edges of the shell as seen in FIGS. 2, 3 and 4. A support rod 30 has the major portion thereof located interiorly of the shell 16 and has axially alined cylindrical end portions 32 and 34 projecting out of each side seam 26 and 28, respectively. A semirigid plastic foam material 36, such as polyurethane, is located within the shell 16 and completely fills the latter so that it encircles and envelops a major portion of the support rod 30 and serves to retain the latter within the body of the sunshade assembly.

The support rod 30 mentioned above is designed so it can serve as a support means for the sunshade as well as a means for facilitating the manufacture of the sunshade assembly. In this connection, it will be noted that the end portion 34 is a tubular member having a passage 38 therein. The inner end of the end portion 34 is rigidly connected to one end of a crossmember 40, the other end of which is rigid with the end portion 32. The end portion 32 has an elongated slot or passage 42 formed therein which as seen in FIG. 6 serves to communicate the interior of the sunshade shell 16 with atmosphere. Thus, both end portions 32 and 34 have passages formed therein which play an important role during the manufacture of the sunshade assembly to be described now.

As seen in FIGS. 5, 6 and 7, the preferred method of manufacturing the sunshade assembly described above is shown. Initially, the two sheets 18 and 20 of thermoplastic material such as polyvinyl chloride are superimposed one above the other and placed between upper and lower electrodes 44 and 46 of a dielectric embossing press having the usual high frequency alternating current generator 48. The upper electrode 44 is movable through operating means (not shown) toward and away from the lower electrode while the generator is capable of impressing an alternating current at a frequency between 1 and 100 megacycles between the electrodes. This type of heating press is well known in the art and therefore further comment with respect thereto is not believed to be necessary.

The upper electrode 44 is formed so as to have a blade 50 of a configuration conforming with the sunshade body shape desired so that upon closing the press and after impressing the alternating current between the electrodes, the outer edges of the sheets are bonded together so as to provide the seams 22, 26 and 28 of the sunshade shell. Thus, it will be understood that during this portion of the manufacturing process only the longitudinal edge furthest from the support rod and the two side edges are bonded together leaving the longitudinal edge adjacent the support rod open. Moreover, along each side seam 26 and 28 and at a point where the end portion of the support rod 30 is to be inserted, a gap 52 is left in the bonding seam having a dimension which assures that when the associated end portion is inserted into the gap, a tight seal is provided by the sheets 18 and 20 around the end portion. The bonded plastic sheets 18 and 20 are then removed from the press and the side edges 26 and 28 are stretched laterally outwardly relative to each other over the end portions 32 and 34 of the support rod 30 permitting each end portion to pass through the gap 52 provided along each side edge. At this point, the unsealed longitudinal edge is sealed within a dielectric embossing press of the type shown in FIG. 5 to form the seam 24, it being understood that the associated electrodes are formed in such way that only the one edge is bonded together.

Thereafter, the assembly takes the form shown in FIG. 6 which is then inserted into a mold consisting of lower and upper die members 54 and 56, respectively, which have the interior formed with the general outer configuration of the sunshade body. As seen in FIG. 7, the mold permits each of the end portions 32 and 34 to project out of the die members so that the passages 38 and 42 communicate with atmosphere. At this point, the function of the passages 38 and 42 comes into play in that end portion 34 is adapted to receive the nozzle end of an injector device 58 which contains polyurethane in a liquid state. The injector device 58 provides a predetermined amount of the liquid polyurethane into the interior of the sunshade sheel and as the polyurethane starts to expand, the air displaced within the sunshade shell 16 is exhausted through the passage 42 located in the end portion 32.

One type of polyurethane foam which can be used to fill the shell 16 consists of a polyol component having a catalyst, polyol, silicone and blowing agent, and a prepolymer component consisting of a premix or prepolymer of the isocyanate and polyol. As in the case of most polyurethane foams, the rate of reaction is quite rapid and the viscosity is low to facilitate injecting the liquid foam into the passage 38 of the support rod 30. The plastic foam when cured, can have a density of 5 to 12 pounds per cubic foot which will provide a semirigid construction having a compression-load-deflection figure in the range of 20—40 p.s.i. It has been found that foam of this type is able to withstand a bending action in the short axis of the sunshade assembly without any interior support required.

After the foam has been injected into the sunshade shell 16 and has been cured, the sunshade assembly shown in FIGS. 2 through 4 is made with the support rod 30 completely enveloped and encircled by the foam material 36 and is rigidly held thereby from relative rotational movement with respect to the sunshade body. In this regard, it will be noted that as seen in FIG. 4, the crossmember 40 is generally J-shaped in cross section and includes a semicircular base 60, the opposite ends of which are attached to the end portions 32 and 34 as aforedescribed and also a laterally extending tab 62 which can extend the full length of the base 60. This configuration provides opposed flat surfaces 64 and 66 on the tab 62 which intimately are in contact with the foam material 36 so as to prevent rotation of the end portions 32 and 34 about their center longitudinal axis, which is indicated in FIG. 4 by the letter A. This is one manner of preventing relative rotation of the support rod 30, however, there are various other crossmember configurations which would accomplish the same result. For example, a portion of the base 60 could be offset with respect to the axis A toward the longitudinal seam 22 and thereby preclude rotational movement of the support rod 30. Moreover, it will be understood that although the passage 42 provided in the end portion 32 takes the form of an elongated slot in the preferred form, it can also be varied so long as some form of vent is provided at this particular end. For example, rather than a singular slot as provided in the end portion, the latter can be knurled with the valleys thereof extending beyond the portion which engages the periphery of the end portion. The important consideration here is that a sufficient opening be provided for venting the sunshade shell interior during manufacture without permitting the foam material to leak out about the periphery of the end portion 32.

Various changes and modifications can be made in this construction without departing from the spirit of the invention. Such changes and modifications are contemplated by the inventors and they do not wish to be limited except by the scope of the appended claims.

We claim:

1. A support rod for use in forming and supporting a sunshade assembly having a sunshade body filled with a semirigid foam material, said support rod adapted to be embedded in said foam material adjacent one longitudinal edge of the sunshade for pivotally supporting the latter above the windshield of a vehicle for movement about a transverse horizontal axis, the improvement wherein said support rod comprises a pair of end portions which project out of the sunshade body, each of said end portions having a passage connecting the interior of the sunshade body with the exterior thereof with one of said passages serving as a fill conduit and the other as a vent when the sunshade is being filled with said foam material, and a crossmember adapted to be located within said sunshade body for rigidly interconnecting said end portions, said crossmember adapted to be enveloped by said foam material and having means formed therewith for preventing rotation of said support rod relative to the sunshade body.

2. A sunshade assembly having a sunshade body filled with a semirigid foam material and a support rod embedded in said foam material adjacent one longitudinal edge of the sunshade for pivotally supporting the latter above the windshield of a vehicle, the improvement wherein said support rod comprises a pair of substantially cylindrical end portions which project out of the sunshade body, each of said end portions having a passage leading from the interior of the sunshade body to the exterior thereof with one of said passages serving as a fill conduit and the other as a vent when the sunshade is being filled with said foam material, and a crossmember generally J-shaped in cross section within said sunshade body and having the rounded portion thereof rigidly interconnecting said cylindrical end portions and enveloped by said foam material so as to prevent rotation of said cylindrical support rod relative to the sunshade body.

3. A sunshade assembly having a plastic sunshade body filled with a semirigid foam material and a support rod embedded in said foam material adjacent one longitudinal edge of the sunshade for pivotally supporting the latter above a vehicle windshield for movement about a transverse horizontal axis, the improvement wherein said support rod comprises a pair of axially alined substantially cylindrical end portions which project out of the sunshade body, each of said end portions having a passage connecting the interior of the sunshade body with the exterior thereof with one of said passages serving as a fill conduit and the other as a vent when the sunshade is being filled with said foam material, and a crossmember within said sunshade body rigidly interconnecting said end portions, said crossmember being enveloped by said foam material and having means formed therewith for preventing rotation of said support rod relative to the sunshade body.

4. A sunshade assembly having a sunshade body filled with a semirigid foam material and a support rod embedded in said foam material adjacent one longitudinal edge of the sunshade for pivotally supporting the latter above the windshield of a vehicle for movement about a transverse horizontal axis, the improvement wherein said support rod comprises a pair of axially alined substantially cylindrical end portions which project out of the sunshade body, each of said end portions having a passage connecting the interior of the sunshade body with the exterior thereof with one of said passages serving as a fill conduit and the other as a vent when the sunshade is being filled with said foam material, and a crossmember within said sunshade body rigidly interconnecting said end portions and completely enveloped by said foam material, said crossmember including a tab that is offset from a longitudinal center line passing through the cylindrical end portions, said tab having opposed surfaces contacting said foam material and preventing rotation of said support rod relative to the sunshade body.